(12) United States Patent
Ogoh (10) Patent No.: US 9,259,839 B2
(45) Date of Patent: Feb. 16, 2016

(54) CONTROLLER AND ROBOT SYSTEM

(71) Applicant: KABUSHIKI KAISHA YASKAWA DENKI, Kitakyushu-shi (JP)

(72) Inventor: Keita Ogoh, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/218,988

(22) Filed: Mar. 19, 2014

(65) Prior Publication Data

US 2015/0081093 A1  Mar. 19, 2015

(30) Foreign Application Priority Data

Sep. 13, 2013  (JP) ................................. 2013-190980

(51) Int. Cl.
| | |
|---|---|
| *G06F 19/00* | (2011.01) |
| *B25J 9/16* | (2006.01) |
| *G05B 19/414* | (2006.01) |
| *B25J 19/06* | (2006.01) |
| *G05B 19/406* | (2006.01) |

(52) U.S. Cl.
CPC *B25J 9/16* (2013.01); *B25J 9/1674* (2013.01); *B25J 19/06* (2013.01); *G05B 19/406* (2013.01); *G05B 19/414* (2013.01); *G05B 2219/34189* (2013.01); *G05B 2219/42284* (2013.01); *G05B 2219/49152* (2013.01); *G05B 2219/50181* (2013.01)

(58) Field of Classification Search
CPC .................................... B25J 9/16; B25J 19/06
USPC ........................................ 700/1, 245–264, 79
See application file for complete search history.

(56) References Cited

U.S. PATENT DOCUMENTS

| | | | |
|---|---|---|---|
| 5,841,257 A | 11/1998 | Hashimoto et al. | |
| 6,683,432 B2 * | 1/2004 | Griffis ...................... | 318/568.16 |
| 2001/0027352 A1 | 10/2001 | Morita et al. | |
| 2007/0032905 A1 | 2/2007 | Nagatsuka et al. | |
| 2008/0021597 A1 * | 1/2008 | Merte et al. .................... | 700/255 |
| 2008/0114492 A1 | 5/2008 | Miegel et al. | |
| 2011/0222995 A1 | 9/2011 | Irie et al. | |

FOREIGN PATENT DOCUMENTS

| | | |
|---|---|---|
| CN | 1907655 | 2/2007 |
| CN | 101546196 | 9/2009 |
| CN | 102189551 | 9/2011 |

(Continued)

OTHER PUBLICATIONS

Korean Office Action for corresponding KR Application No. 10-2014-0032035, Sep. 17, 2015.

(Continued)

*Primary Examiner* — Bhavesh V Amin
(74) *Attorney, Agent, or Firm* — Mori & Ward, LLP (57) ABSTRACT

A controller includes: a plurality of first drivers that outputs a plurality of drive signals to drive a plurality of motors, respectively, and stops an output of the drive signals with a stop signal; a second driver that outputs a drive signal to drive another motor, and stops an output of the drive signal with a stop signal; a first transmitter that transmits the stop signal to all the first drivers; a second transmitter that transmits the stop signal to the second driver; and a stop signal introduction unit capable of introducing separate stop signals to into the first transmitter and the second transmitter, respectively.

8 Claims, 9 Drawing Sheets

(56) References Cited

FOREIGN PATENT DOCUMENTS

| EP | 1004437 | 5/2000 |
| EP | 1186386 | 3/2002 |
| JP | 02-023080 | 1/1990 |
| JP | 2003-39375 | 2/2003 |
| WO | WO 91/09354 | 6/1991 |

OTHER PUBLICATIONS

Extended European Search Report for corresponding EP Application No. 14156699.2-1807, Jun. 11, 2015.
Japanese Office Action for corresponding JP Application No. 2013-190980, Jul. 14, 2015.
Chinese Office Action for corresponding CN Application No. 201410103386.9, Nov. 3, 2015.

* cited by examiner

CONTROLLER AND ROBOT SYSTEM

CROSS-REFERENCE TO RELATED APPLICATION

This application is based upon and claims the benefit of priority from Japanese Patent Application No. 2013-190980, filed Sep. 13, 2013, the entire contents of which are incorporated herein by reference.

BACKGROUND

1. Field

The present disclosure relates to a controller and a robot system.

2. Description of the Related Art

For example, industrial machines such as robots and NC (Numerically-Controlled) machines automatically controlled by controllers have been widely put to practical use. For ensuring safety in a manufacturing process using such industrial machines, a mechanism that reliably stops the industrial machines in operation is required. On the other hand, in a case in which the industrial machines are caused to stop by the interruption of power, it takes time for the industrial machines to restart due to the restoration of the power again or the like, which causes a reduction in the operation efficiency of the industrial machines. In order to address the problem, Japanese Patent Application Laid-Open No. 2-23080, for example, discloses a controller capable of simultaneously interrupting an output to all the actuators of a robot or the like without interrupting power.

SUMMARY

A controller according to the present disclosure includes: a plurality of first drivers that outputs a plurality of drive signals to drive a plurality of actuators, respectively, and stops an output of the drive signals with a stop signal; a second driver that outputs a drive signal to drive another actuator, and stops an output of the drive signal with a stop signal; a first transmitter that transmits the stop signal to all the first drivers; a second transmitter that transmits the stop signal to the second driver; and a stop signal introduction unit capable of introducing separate stop signals into the first transmitter and the second transmitter, respectively.

A robot system according to the present disclosure includes: the controller described above; an articulated arm driven by all the actuators that operate with the drive signals from the first drivers; and at least one external apparatus driven by the actuator that operates with the drive signal from the second driver.

DETAILED DESCRIPTION

Hereinafter, a description will be given in detail of an embodiment with reference to the drawings. The same elements or elements having the same functions will be denoted by the same symbols, and their duplicated descriptions will be omitted.

Figure 1:
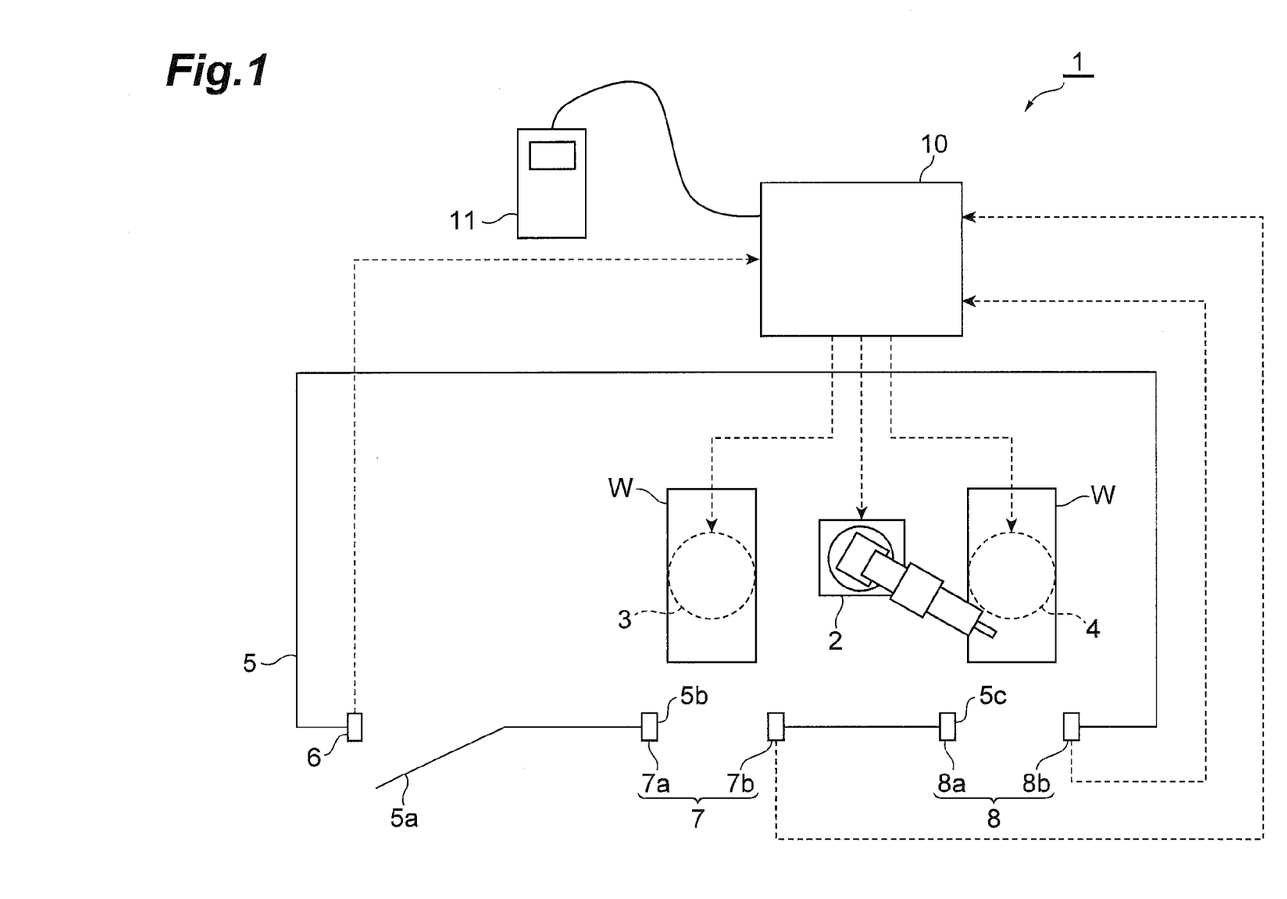
FIG. 1 is a schematic diagram illustrating the rough configuration of a robot system according to an embodiment.

As illustrated in FIG. 1, a robot system 1 according to the embodiment has an articulated arm 2, positioners (external apparatuses) 3 and 4, a fence 5, a door open sensor (first sensor) 6, entrance sensors (second sensors) 7 and 8, and a controller (control apparatus) 10.

The articulated arm 2 has six axis joints. Each of the joints incorporates a motor (actuator) and a brake in pairs. The articulated arm 2 performs various operations such as mounting of components, welding, and screwing on a workpiece W. Note that the number of the joints of the articulated arm 2 is not limited to six as will be described later.

The positioners 3 and 4 hold the workpiece W, have a drive mechanism having at least one degree of freedom, and adjust at least one of the posture and position of the workpiece W to suit the operations of the articulated arm 2. For example, the positioners 3 and 4 have a one axis rotation mechanism that rotates the workpiece W about a vertical axis line. The rotation mechanism incorporates a motor (actuator) and a brake in pairs.

Hereinafter, the motors of the articulated arm 2 will be called "basic axis motors," and the other motors will be called "external axis motors." The brakes of the articulated arm 2 will be called "basic axis brakes," and the other brakes will be called "external axis brakes."

The fence 5 is provided so as to surround the articulated arm 2 and the positioners 3 and 4 and has a door portion 5a, a window portion 5b, and a window portion 5c. The door portion 5a allows the coming and going of a person. The window portion 5b is an opening provided corresponding to the position of the positioner 3 and allows the mounting of the workpiece W on the positioner 3 from the outside of the fence 5 and the removal of the workpiece W on the positioner 3 to the outside of the fence 5. The window portion 5c is an opening provided corresponding to the position of the positioner 4 and allows the mounting of the workpiece W on the positioner 4 from the outside of the fence 5 and the removal of the workpiece W on the positioner 4 to the outside of the fence 5.

The door open sensor 6 is, for example, a limit switch. The door open sensor 6 detects the opening of the door portion 5a and sends the detected signal to the controller 10 as a stop signal.

The entrance sensor 7 is an optical sensor having, for example, a light emission portion 7a and a light reception portion 7b. The light emission portion 7a and the light reception portion 7b are provided at the edge of the window portion 5b and arranged so as to face each other. The light emission portion 7a emits inspection light to the side of the light reception portion 7b. The light reception portion 7b receives the inspection light. The entrance sensor 7 detects the entrance of an object into the window portion 5b based on whether the light reception portion 7b receives the inspection light and sends the detected signal to the controller 10 as a stop signal.

The entrance sensor 8 is a sensor similar to the entrance sensor 7. A light emission portion 8a and a light reception portion 8b of the entrance sensor 8 are provided at the edge of the window portion 5c and arranged so as to face each other. The entrance sensor 8 detects the entrance of an object into the window portion 5c based on whether the light reception portion 8b receives inspection light and sends the detected signal to the controller 10 as a stop signal.

Figure 2:
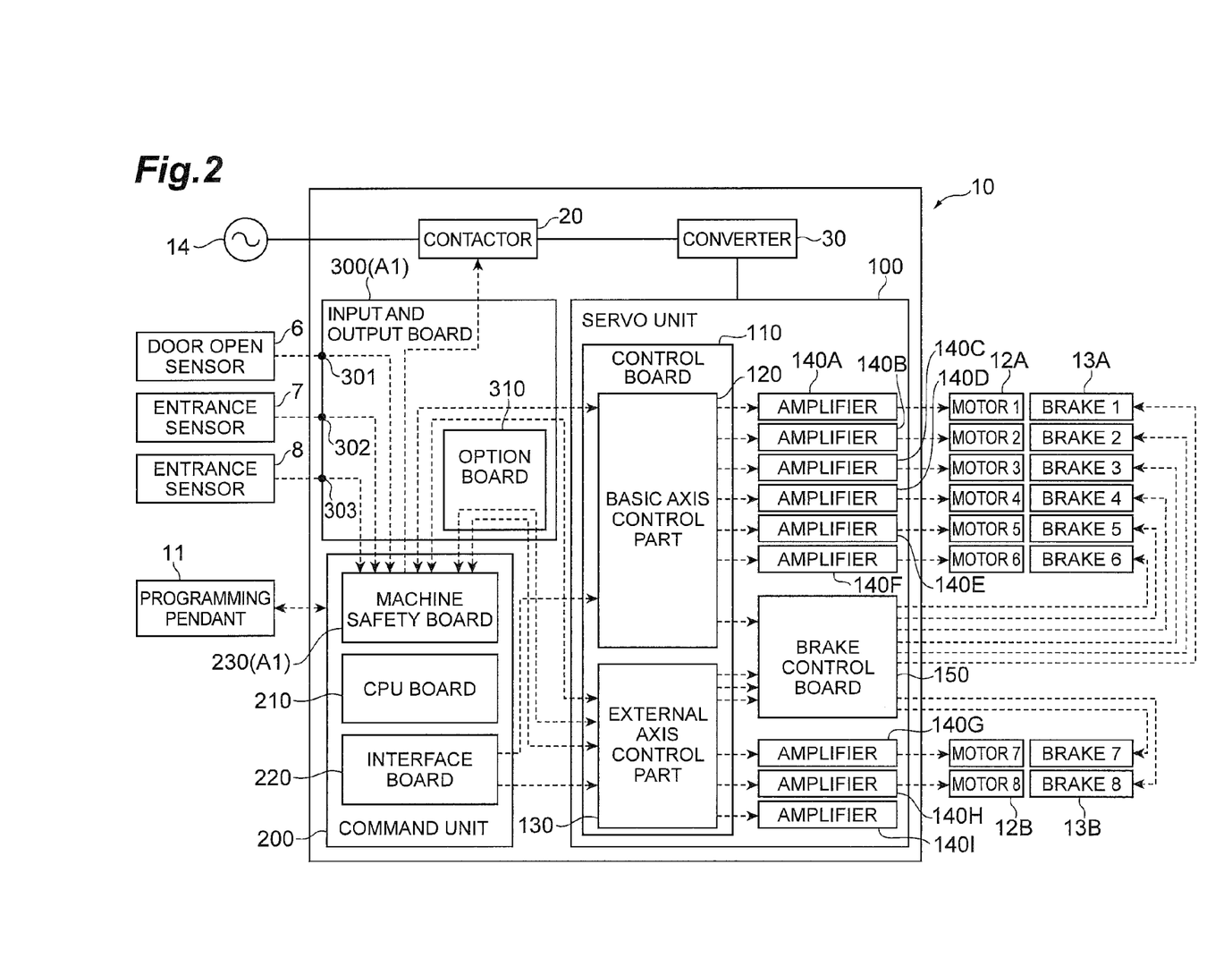
FIG. 2 is a block diagram of a controller.

The controller 10 controls the motors and brakes of the articulated arm 2 and the motors and brakes of the positioners 3 and 4. The controller 10 is connected to a programming pendant 11 via a cable. The programming pendant 11 is a device for performing an input operation with respect to the controller 10. As illustrated in FIG. 2, the controller 10 incorporates a contactor 20, a converter 30, a servo unit 100, a command unit 200, and an input and output board 300 and is operated with power supplied from an alternate current source 14.

The contactor 20 is interposed between the respective units of the controller 10 and the alternate current source 14 and switches connection and disconnection to and from the alternate current source 14 with an error detection signal. The converter 30 converts an alternate current supplied from the alternate current source 14 into a direct current and supplies the direct current to the respective units of the controller 10. The servo unit 100 outputs drive power to nine motors and nine brakes. The command unit 200 controls the motors and brakes via the servo unit 100. The input and output board 300 is interposed between the sensors 6 to 8 and the command unit 200, between the servo unit 100 and the command unit 200, and between the contactor 20 and the command unit 200 and relays various signals.

The servo unit 100 has a control board 110, nine amplifiers 140A to 140I, and a brake control board (brake controller) 150. The control board 110 has a basic axis control part 120 and an external axis control part 130. The control board 110 may be a single board or divided into two boards. The functions of the basic axis control part 120 or the external axis control part 130 may be divided up between two boards.

The basic axis control part 120 is capable of driving six motors via the six amplifiers 140A to 140F, respectively. In the robot system 1, the six basic axis motors 12A of the articulated arm 2 are driven by the basic axis control part 120.

Figure 3:
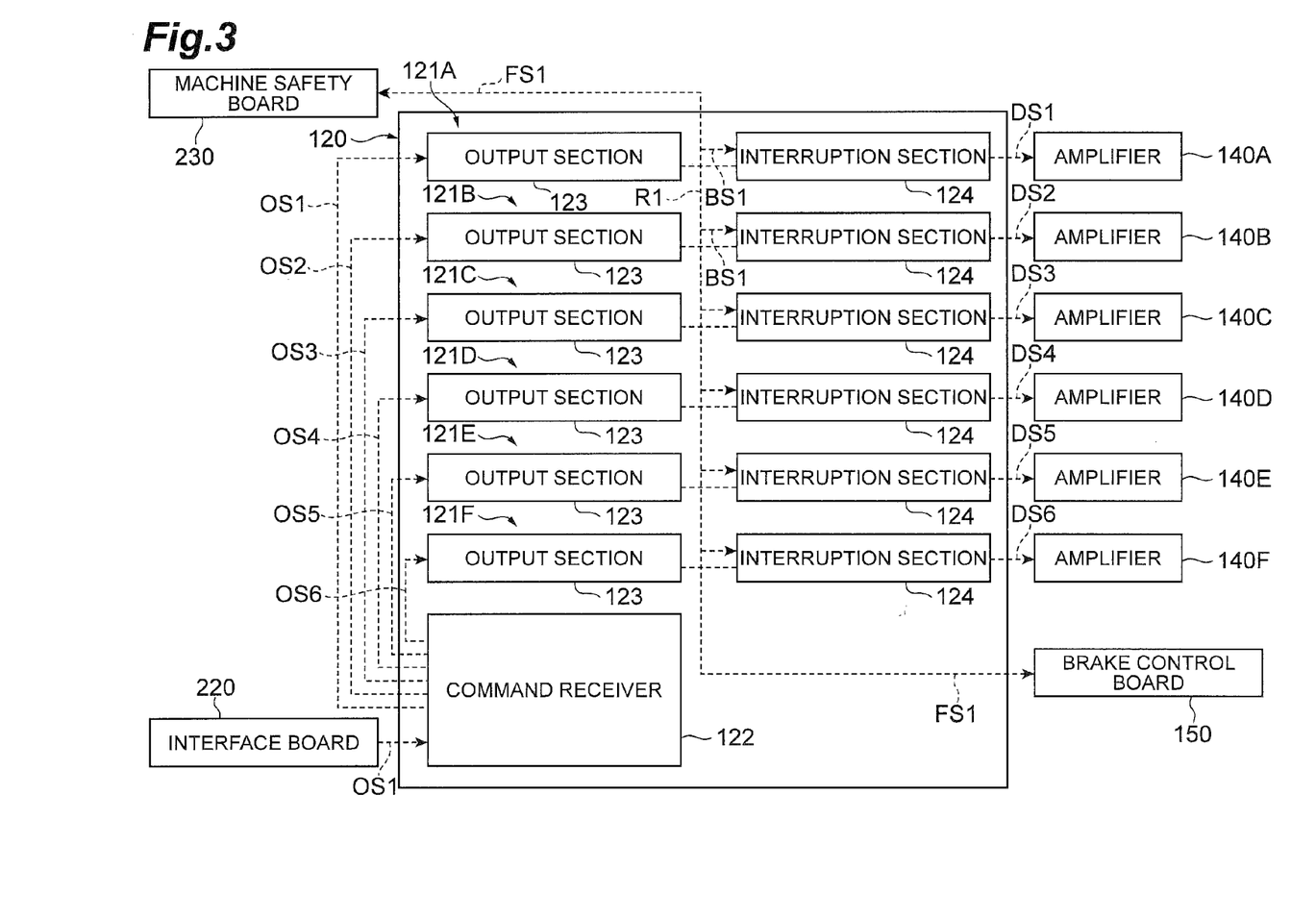
FIG. 3 is a block diagram of a basic axis control part.

The basic axis control part 120 has six drivers (first drivers) 121A to 121F and a command receiver 122 (see FIG. 3). The command receiver 122 receives command signals OS1 to OS6 sent from the command unit 200 via, for example, digital serial communication and transfers the command signals to the drivers 121A to 121F, respectively.

Each of the drivers 121A to 121F has an output section 123 and an interruption section 124. The command signals OS1 to OS6 are input to the output sections 123 of the drivers 121A to 121F, respectively. Upon receiving the signals, the output sections 123 of the drivers 121A to 121F output drive signals DS1 to DS6, respectively. The drive signals DS1 to DS6 are signals for driving the motors and input to the amplifiers 140A to 140F, respectively. The drive signals DS1 to DS6 are, for example, base currents to the power transistors of the amplifiers 140A to 140F.

The interruption sections 124 are, for example, relays or semiconductor switches and interposed between the output sections 123 and the amplifiers 140A to 140F. The interruption sections 124 interrupt the output of the drive signals DS1 to DS6 with the input of a stop signal. In other words, the drivers 121A to 121F stop the output of the drive signals DS1 to DS6 with the input of the stop signal. The interruption sections 124 output a feed back signal indicating the input of the stop signal.

In the basic axis control part 120, a stop signal BS1 output from a machine safety board 230 is input and then split and transmitted to the interruption sections 124 of all the drivers 121A to 121F. In other words, the basic axis control part 120 further has a transmitter (first transmitter) R1 that transmits the one stop signal BS1 to all the drivers 121A to 121F. Splitting the stop signal BS1 inside the basic axis control part 120 can contribute to a reduction in wiring for sending the stop signal BS1 from the command unit 200 to the basic axis control part 120.

The six feed back signals output from the interruption sections 124 of the drivers 121A to 121F are integrated into one reception confirmation signal FS1 and sent from the basic axis control part 120 to the machine safety board 230. The reception confirmation signal FS1 is sent when the interruption sections 124 of all the drivers 121A to 121F output the feed back signal. The reception confirmation signal FS1 is also sent from the basic axis control part 120 to the brake control board 150 and used as a signal for driving basic axis brakes 13A. Instead of the reception confirmation signal FS1, the stop signal BS1 may be output to the brake control board 150 and used as a signal for driving the basic axis brakes 13A.

It may also be possible to dualize a configuration that interrupts the output of each of the drive signals DS1 to DS6. Specifically, it may also be possible to provide the two interruption sections 124 connected in series each other for each of the drivers 121A to 121F and separately provide the transmitters that transmit the stop signal for one and the other of the interruption sections 124. Correspondingly, it may also be possible to dualize the output sources of the stop signals such as the door open sensor 6 and the entrance sensors 7 and 8 and introduce the two stop signals output from the dual output sources into the two transmitters, respectively. In this case, even if an error occurs in one of the interruption sections 124, the drive signals DS1 to DS6 can be interrupted with the other of the interruption sections 124. Even if the stop signal is not input to one of the transmitters, the drive signals DS1 to DS6 can be interrupted provided that the stop signal is input to the other of the transmitters. Thus, the motors can be more reliably stopped.

In a case in which the two interruption sections 124 connected in series each other are provided for each of the drivers 121A to 121F, the reception confirmation signal FS1 may be output when the stop signal is input to at least one of the interruption sections 124 in each of the drivers 121A to 121F.

The external axis control part 130 is capable of driving three motors via the three amplifiers 140G to 140I, respectively. In the robot system 1, two external axis motors 12B that drive the positioners 3 and 4 are driven by the external axis control part 130.

Figure 4:
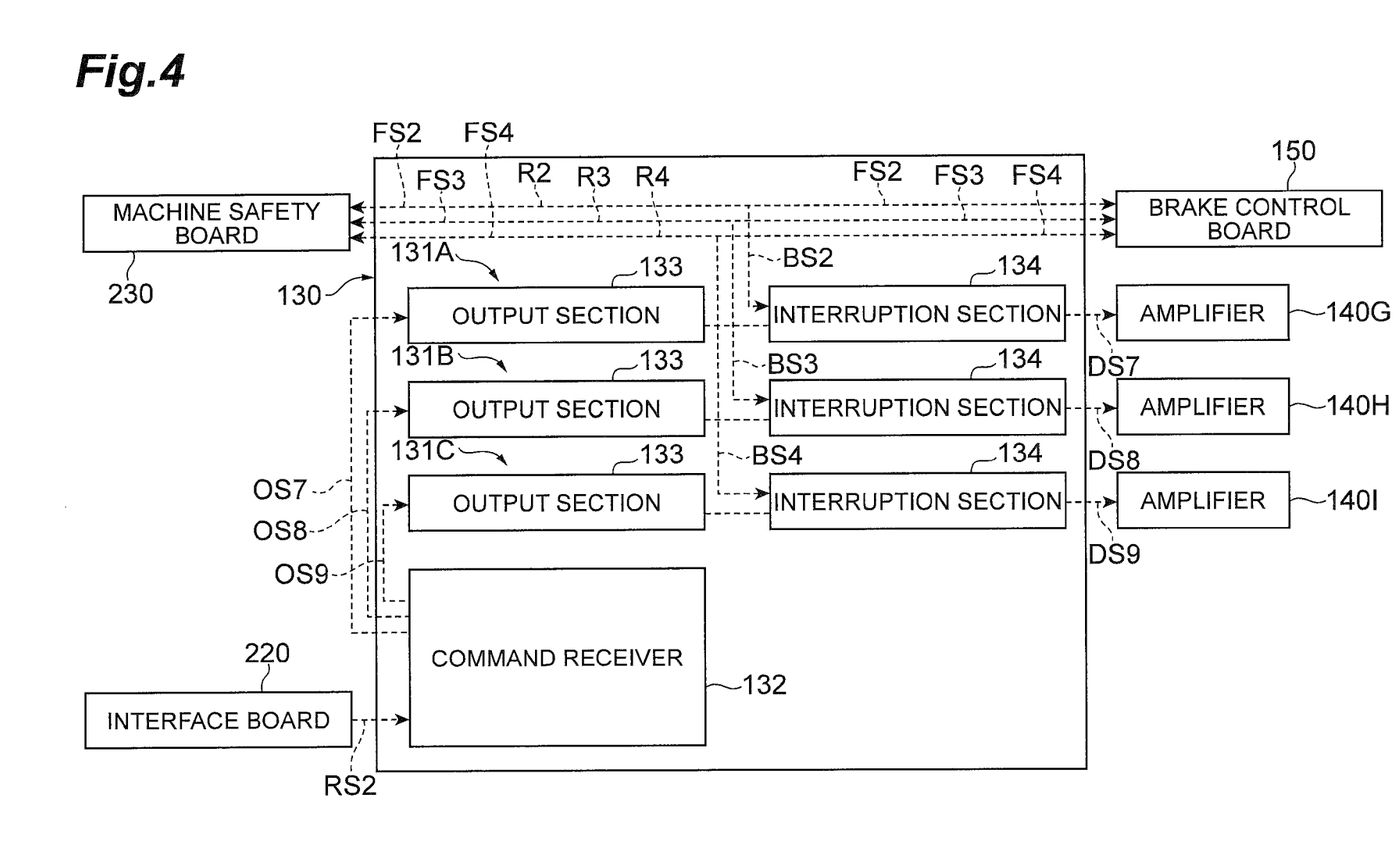
FIG. 4 is a block diagram of an external axis control part.

The external axis control part 130 has three drivers (second drivers) 131A to 131C and a command receiver 132 (see FIG. 4). The command receiver 132 receives command signals OS7 to OS9 sent from the command unit 200 via, for example, digital serial communication and transfers the command signals to the drivers 131A to 131C.

Each of the drivers 131A to 131C has an output section 133 and an interruption section 134. The command signals OS7 to OS9 are input to the output sections 133 of the drivers 131A to 131C, respectively. Upon receiving the signals, the output sections 133 of the drivers 131A to 131C output drive signals DS7 to DS9, respectively. The drive signals DS7 to DS9 are signals for driving the motors and input to the amplifiers 140G to 140I, respectively. The drive signals DS7 to DS9 are base currents to the power transistors of the amplifiers 140G to 140I, for example.

The interruption sections 134 are, for example, relays or semiconductor switches and interposed between the output sections 133 and the amplifiers 140G to 140I. The interruption sections 134 of the drivers 131A to 131C interrupt the output of the drive signals DS7 to DS9 with the input of a stop signal. In other words, the drivers 131A to 131C stop the output of the drive signals DS7 to DS9 with the input of the stop signal, respectively. The interruption sections 134 of the drivers 131A to 131C output feed back signals FS2 to FS4, respectively, indicating the input of the stop signal.

In the external axis control part 130, three stop signals BS2 to BS4 are transmitted from the machine safety board 230 and transmitted to the interruption sections 134 of the drivers 131A to 131C, respectively. In other words, the external axis control part 130 further has transmitters (second transmitters) R2 to R4 that transmit the stop signals BS2 to BS4 to the interruption sections 134 of the drivers 131A to 131C, respectively. The transmitters R2 to R4 are provided corresponding to the drivers 131A to 131C, respectively.

Each of the feed back signals FS2 to FS4 output from the interruption sections 134 is sent to the machine safety board 230 as a reception confirmation signal. The reception confirmation signals FS2 to FS4 are also sent to the brake control board 150 and used as signals for driving external axis brakes 13B. Instead of the reception confirmation signals FS2 to FS4, the stop signals BS2 to BS4 may be output to the brake control board 150 and used as signals for driving the brakes.

It may also be possible to dualize a configuration that interrupts the output of each of the drive signals DS7 to DS9. Specifically, it may also be possible to provide the two interruption sections 134 connected in series each other for each of the drivers 131A to 131C and separately provide the transmitters that transmit the stop signal for one and the other of the interruption sections 134. Correspondingly, it may also be possible to dualize the output sources of the stop signals such as the door open sensor 6 and the entrance sensors 7 and 8 and introduce the two stop signals output from the dual output sources into the two transmitters. In this case, even if an error occurs in one of the interruption sections 134, the drive signals DS7 to DS9 can be interrupted with the other of the interruption sections 134. Even if the stop signal is not input to one of the transmitters, the drive signals DS7 to DS9 can be interrupted provided that the stop signal is input to the other of the transmitters. Thus, the motors can be more reliably stopped.

In a case in which the two interruption sections 134 connected in series each other are provided for each of the drivers 131A to 131C, the reception confirmation signals FS2 to FS4 may be output when the stop signal is input to at least one of the interruption sections 134 in each of the drivers 131A to 131C.

The amplifiers 140A to 140I have, for example, the power transistor and supply drive power corresponding to the drive signals DS1 to DS9 to the respective motors.

Figure 5:
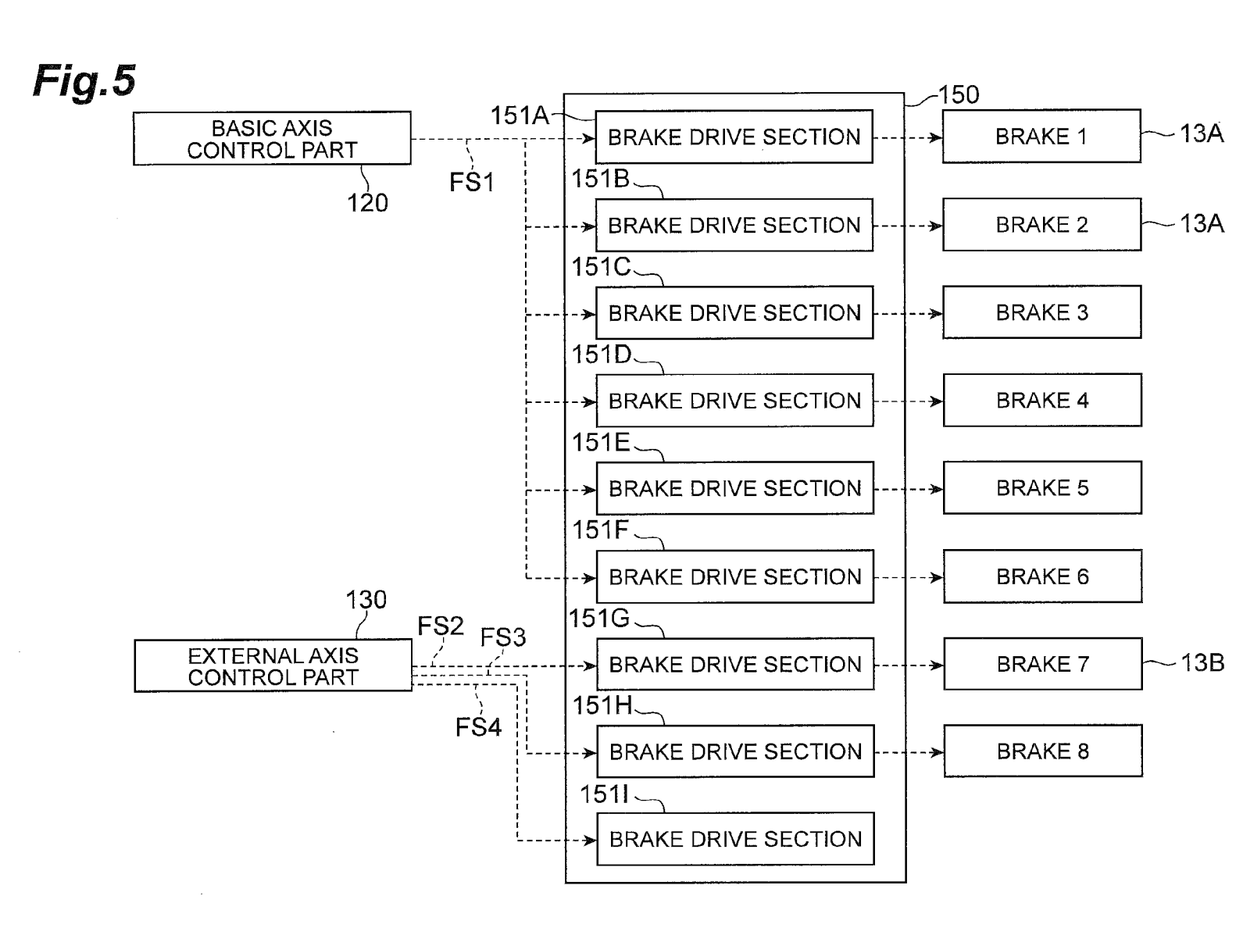
FIG. 5 is a block diagram of a brake control board.

The brake control board (brake controller) 150 has nine brake drive sections 151A to 151I (see FIG. 5). In the robot system 1, the six basic axis brakes 13A are connected to the brake drive sections 151A to 151F, respectively. The external axis brakes 13B of the positioners 3 and 4 are connected to the brake drive sections 152G and 152H, respectively.

The one reception confirmation signal FS1 output from the basic axis control part 120 is split and input to the brake drive sections 151A to 151F. The brake drive sections 151A to 151F operate the corresponding brake with the input of the reception confirmation signal FS1.

The three reception confirmation signals FS2 to FS4 are input to the three brake drive sections 151G to 151I, respectively. The brake drive sections 151G to 151I operate the corresponding brake with the input of the reception confirmation signals FS2 to FS4, respectively.

As described above, the reception confirmation signals FS1 to FS4 are output corresponding to the stop signals BS1 to BS4, respectively. Thus, by operating the corresponding brake with the stop signals BS1 to BS4, the brake drive sections 151A to 151I operate the corresponding brake in conjunction with the stop of the drive signals DS1 to DS9.

Specifically, the brake drive sections 151A to 151F operate the six basic axis brakes 13A corresponding to the six basic axis motors 12A in conjunction with the stop of the drive signals DS1 to DS6, respectively. The brake drive section 151G operates the external axis brake 13B corresponding to the external axis motor 12B of the positioner 3 in conjunction with the stop of the drive signal DS7. The brake drive section 151H operates the external axis brake 13B corresponding to the external axis motor 12B of the positioner 4 in conjunction with the stop of the drive signal DS8. Thus, the brake controller 150 operate the brakes corresponding to the motors in conjunction with the stop of the drive signals DS1 to DS9 for driving the motors.

The command unit 200 has a CPU board 210, an interface board 220, and the machine safety board 230. The CPU board 210 calculates target control values or the like of the motors 12A and 12B with a stored program or an input via the programming pendant 11. The interface board 220 outputs the command signals OS1 to OS9 to the servo unit 100 with the target control values calculated by the CPU board 210.

Figure 6:
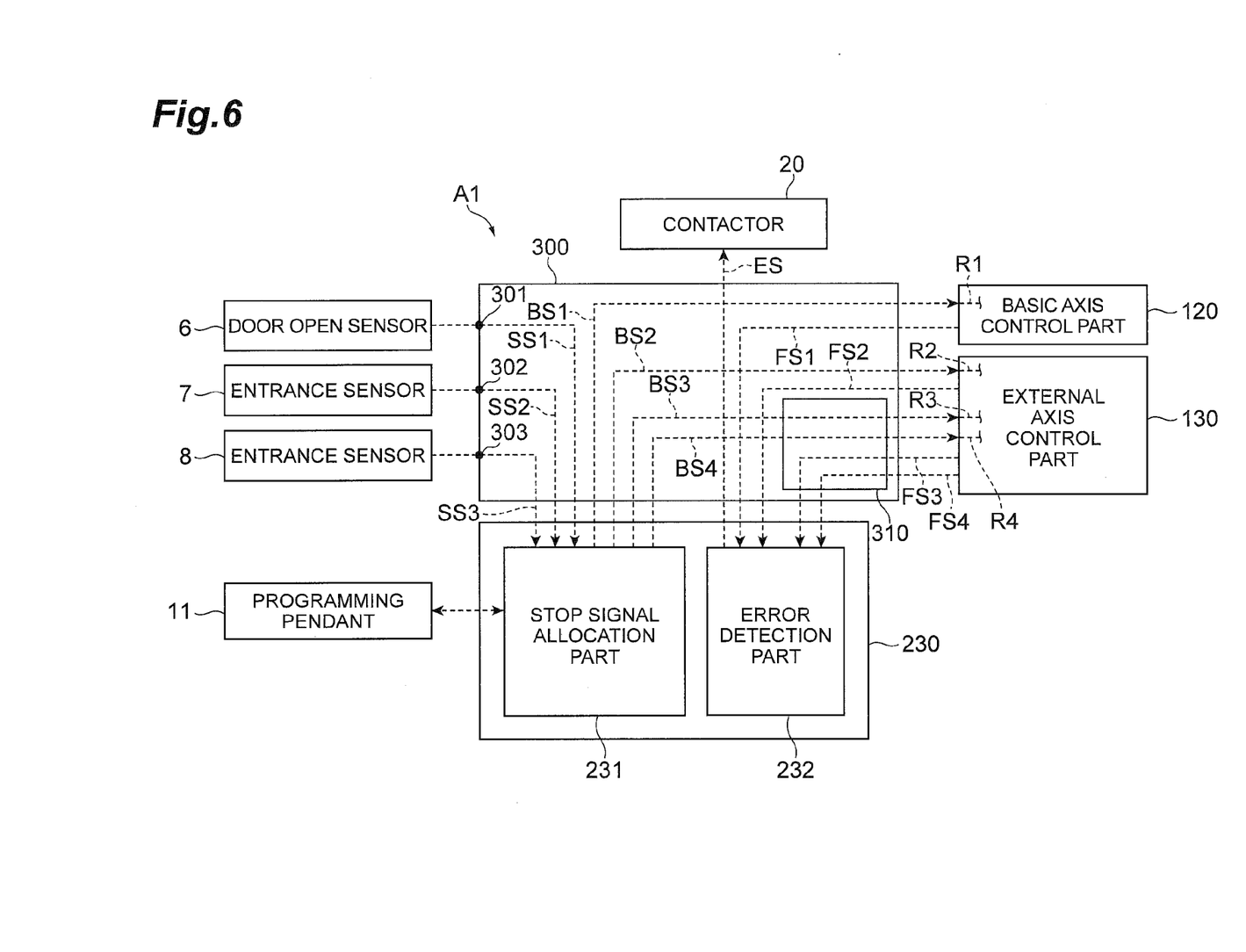
FIG. 6 is a block diagram of a stop signal introduction unit.

As illustrated in FIG. 6, the machine safety board 230 constitutes a stop signal introduction unit A1 in cooperation with the input and output board 300. The input and output board 300 has a terminal 301 to which the door open sensor 6 is connected, a terminal 302 to which the entrance sensor 7 is connected, and a terminal 303 to which the entrance sensor 8 is connected. Part of the input and output board 300 is a removable option board 310. The option board 310 relays the stop signals BS3, BS4 and the reception confirmation signal FS3, FS4 and are required only when these signals are used.

The machine safety board 230 has a stop signal allocation part 231 and an error detection part 232. The stop signal allocation part 231 receives stop signals SS1 to SS3 from the sensors 6 to 8 connected to the terminals 301 to 303, respectively, via the input and output board 300 and outputs any of the signals as the stop signals BS1 to BS4.

The stop signal BS1 is sent to the transmitter R1 of the basic axis control part 120 via the input and output board 300. The stop signals BS2 to BS4 are sent to the transmitters R2 to R4 of the external axis control part 130, respectively, via the input and output board 300.

The stop signal allocation part 231 freely sets the combinations between the stop signals SS1 to SS3 and the stop signals BS1 to BS4 with the input of settings via the programming pendant 11. In other words, the stop signal allocation part 231 freely allocates the terminals 301 to 303 to the transmitters R1 to R4 with the input of settings from the outside. Thus, the stop signal introduction unit A1 is capable of introducing the separate stop signals SS1 to SS3 into the first transmitter R1 and the second transmitters R2 to R4.

Figure 7:
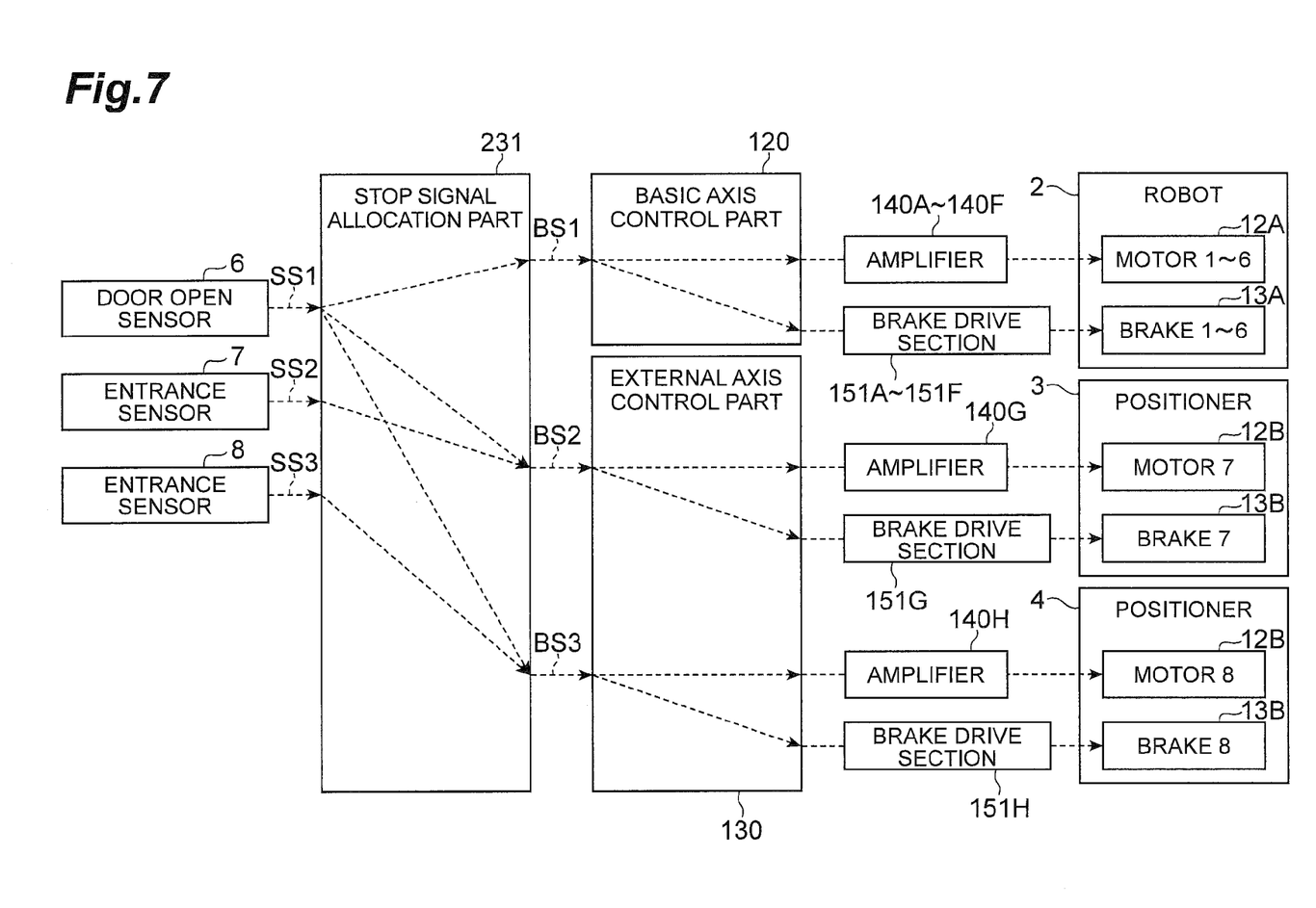
FIG. 7 is a schematic diagram illustrating an allocation of stop signals.

FIG. 7 illustrates an example of the combinations between the stop signals SS1 to SS3 and the stop signals BS1 to BS4. The stop signal allocation part 231 allocates the stop signal SS1 to the stop signals BS1 to BS3, allocates the stop signal SS2 to the stop signal BS2, and allocates the stop signal SS3 to the stop signal BS3.

By the allocation, the stop signal SS1 is transmitted to the drivers 121A to 121F as the stop signal BS1 and transmitted to the drivers 131A and 131B as the stop signals BS2 and BS3. The stop signal SS2 is transmitted to only the driver 131A as the stop signal BS2. The stop signal SS3 is transmitted to only the driver 131B as the stop signal BS3.

In other words, the transmitter R1 transmits the stop signal SS1 from the door open sensor 6 to the drivers 121A to 121F. The transmitter R2 transmits the stop signal SS1 from the door open sensor 6 and the stop signal SS2 from the entrance sensor 7 to the driver 131A. The transmitter R3 transmits the stop signal SS1 from the door open sensor 6 and the stop signal SS3 from the entrance sensor 8 to the driver 131B (see FIGS. 3 and 4).

Therefore, when the stop signal SS1 is sent from the door open sensor 6 with the opening of the door portion 5a, all the articulated arm 2 and the positioners 3 and 4 stop. As a result, safety when a person enters the fence 5 is enhanced. On the other hand, when the stop signal SS2 is sent from the entrance sensor 7 as the workpiece W, an arm of an operator, or the like enters the window portion 5b to mount or remove the workpiece W, only the positioner 3 stops. Thus, it is possible to continue the operation or the like of the articulated arm 2 with respect to the workpiece W on the positioner 4 while stopping the positioner 3 to mount or remove the workpiece W. On the other hand, when the stop signal SS3 is sent from the entrance sensor 8 as the workpiece W, an arm of an operator, or the like enters the window portion 5c to mount or remove the workpiece W, only the positioner 4 stops. Thus, it is possible to continue the operation or the like of the articulated arm 2 with respect to the workpiece W on the positioner 3 while stopping the positioner 4 to mount or remove the workpiece W. Accordingly, it is possible to sufficiently prevent a reduction in operation efficiency while enhancing safety.

Figure 8:
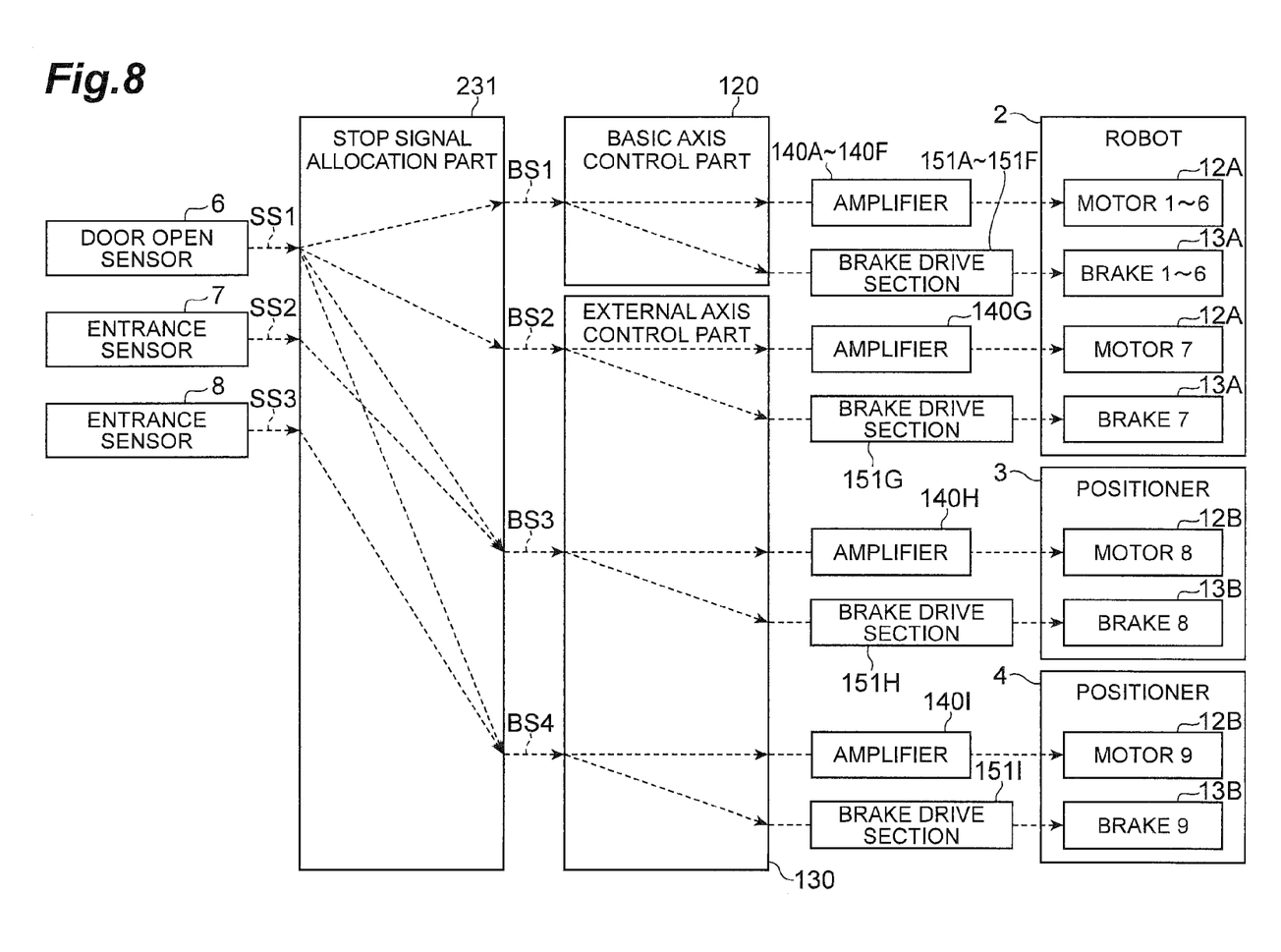
FIG. 8 is a schematic diagram illustrating another example of allocating the stop signals.

FIG. 8 illustrates another example of allocating the stop signals SS1 to SS3 to the stop signals BS1 to BS4. In FIG. 8, the articulated arm 2 has seven axis joints. The six basic axis motors 12A of the articulated arm 2 are connected to the amplifiers 140A to 140F, respectively, and the remaining one basic axis motor 12A (that will be called the "extra motor 12A" hereinafter) is connected to the amplifier 140G. The six basic axis brakes 13A are connected to the brake drive sections 151A to 151F, respectively, and the remaining one basic axis brake 13A (that will be called the "extra brake 13A" hereinafter) is connected to the brake drive section 151G.

The external axis motor 12B of the positioner 3 is connected to the amplifier 140H, and the external axis brake 13B is connected to the brake drive section 151H. The external axis motor 12B of the positioner 4 is connected to the amplifier 140I, and the external axis brake 13B is connected to the brake drive section 151I.

The stop signal allocation part 231 allocates the stop signal SS1 to the stop signals BS1 to BS4, allocates the stop signal SS2 to the stop signal BS3, and allocates the stop signal SS3 to the stop signal BS4. By the allocation, all the articulated arm 2 and the positioners 3 and 4 also stop when the door portion 5a is opened. When the workpiece W, an arm of an operator, or the like enters the window portion 5b, the positioner 3 stops. When the workpiece W, an arm of an operator, or the like enters the window portion 5c, the positioner 4 stops.

The stop signal SS1 is allocated to both the stop signals BS1 and BS2. In other words, the stop signals BS1 and BS2 become the same. Therefore, the extra motor 12A and the extra brake 13A can be stopped in conjunction with the other basic axis motors 12A and the basic axis brakes 13A, respectively. As described above, even if the number of the joints of the articulated arm 2 is greater than that of the drivers 121A to 121F of the basic axis control part 120, the entire articulated arm 2 can be simultaneously stopped.

Figure 9:
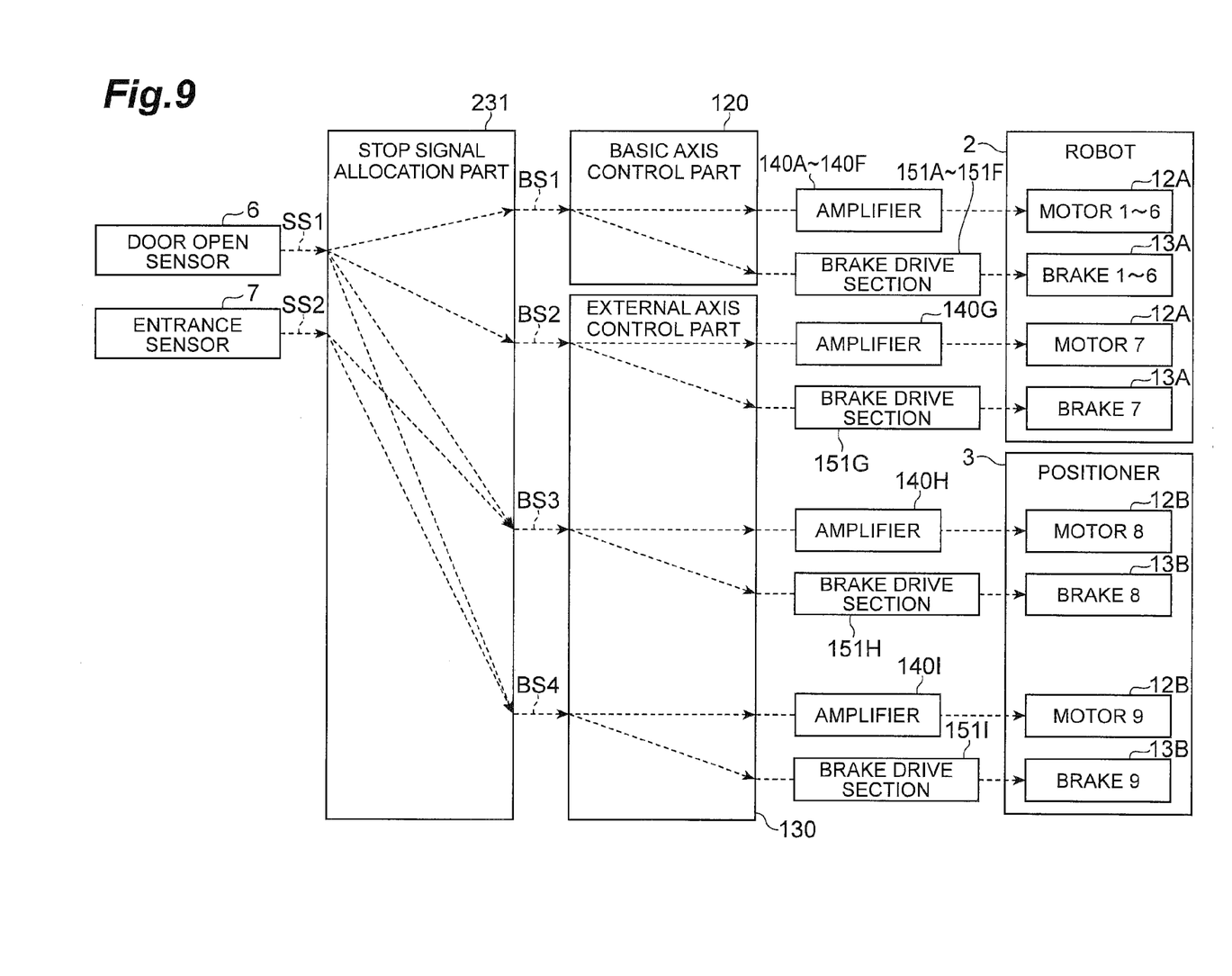
FIG. 9 is a schematic diagram illustrating still another example of allocating the stop signals.

FIG. 9 illustrates still another example of allocating the stop signals SS1 to SS3 to the stop signals BS1 to BS4. In FIG. 9, the articulated arm 2 has seven axis joints. The positioner 3 has two axis rotation portions. The positioner 4 has no drive mechanism and holds the workpiece W in a resting state.

The six basic axis motors 12A of the articulated arm 2 are connected to the amplifiers 140A to 140F, respectively, and the remaining one basic axis motor 12A is connected to the amplifier 140G. The six basic axis brakes 13A are connected to the brake drive sections 151A to 151F, respectively, and the remaining one basic axis brake 13A is connected to the brake drive section 151G. The two external axis motors 12B of the positioner 3 are connected to the amplifiers 140H and 140I, respectively. The two external axis brakes 13B of the positioner 3 are connected to the brake drive sections 151H and 151I, respectively.

The stop signal allocation part 231 allocates the stop signal SS1 to the stop signals BS1 to BS4 and allocates the stop signal SS2 to the stop signals BS3 and BS4. By the allocation, the articulated arm 2 and the positioner 3 stop when the door portion 5a is opened. When the workpiece W, an arm of an operator, or the like enters the window portion 5b, the positioner 3 stops.

The stop signals SS1 and SS2 are allocated to both the stop signals BS3 and BS4. In other words, the stop signals BS3 and BS4 become the same. Therefore, the two external axis motors 12B that drive the positioner 3 stop in conjunction with each other, and the external axis brakes 13B that brake the positioner 3 operate in conjunction with each other. As described above, even if the positioner 3 has the plurality of rotation portions, the entire positioner 3 can be stopped simultaneously.

Referring back to FIG. 6, a description will be given of the error detection part 232. The error detection part 232 receives the reception confirmation signal FS1 from the basic axis control part 120 via the input and output board 300 and receives the reception confirmation signals FS2 to FS4 from the external axis control part 130 via the input and output board 300. When the error detection part 232 cannot receive the reception confirmation signals FS1 to FS4 corresponding to the stop signals BS1 to BS4, it outputs an error detection signal ES to the contactor 20 via the input and output board 300. Thus, the alternate current from the alternate current source 14 is interrupted when an error occurs in the interruption sections 124 and 134, whereby the entire robot system 1 can be reliably stopped.

Since the stop signal BS1 is transmitted from the first transmitter R1 to all the first drivers 121A to 121F by the controller 10 described above, the stop and restart of the six motors connected to the first drivers 121A to 121F can be executed simultaneously. In order to stop or restart a machine driven by a plurality of actuators (that will be called a "multi-axis apparatus" hereinafter) like the articulated arm 2, it is necessary to simultaneously execute the stop or restart of the plurality of actuators. By the allocation of the plurality of first drivers 121A to 121F to the plurality of actuators of the multi-axis apparatus, the stop and restart of the multi-axis apparatus can be quickly executed.

On the other hand, the stop signal introduction unit A1 is capable of transmitting the separate stop signals to the first transmitter R1 and the second transmitters R2 to R4, respectively. Thus, the stop and restart of the motors connected to the first drivers 121A to 121F and the stop and restart of the motors connected to the second drivers 131A to 131C can be separately executed. In other words, a control target can be partially stopped and restarted. Thus, for example, by the allocation of the first drivers 121A to 121F to a multi-axis apparatus and the second drivers 131A to 131C to an external apparatus different from the multi-axis apparatus, it is possible to continue the drive of the multi-axis apparatus while stopping the external apparatus or continue the operation of the external apparatus while stopping the multi-axis apparatus. Accordingly, a reduction in operation efficiency due to the stop and restart of the control target can be sufficiently prevented.

For example, in the robot system 1, the stop and restart of the articulated arm 2 can be quickly executed by the simultaneous execution of the stop and restart of the six basic axis motors 12A. On the other hand, the stop and restart of the basic axis motors 12A of the articulated arm 2 and the stop and restart of the external axis motors 12B of the positioners 3 and 4 can be separately executed. Thus, it is possible to continue the operation of the articulated arm 2 while stopping the positioners 3 and 4 or continue the operation of the positioners 3 and 4 while stopping the articulated arm 2. Accordingly, a reduction in operation efficiency due to the stop and restart of the robot system 1 can be sufficiently prevented.

The controller 10 has the plurality of second drivers 131A to 131C, and the second transmitters R2 to R4 are provided corresponding to the second drivers 131A to 131C, respectively. Therefore, by the fine switch between the stop and operation of the control target, a reduction in operation efficiency can be further prevented.

The stop signal introduction unit A1 has the plurality of terminals 301 to 303 that receive the plurality of stop signals SS1 to SS3, respectively, and has the stop signal allocation part 231 that freely allocates the terminals 301 to 303 to the first transmitter R1 and the second transmitters R2 to R4 with the input of settings from the outside. Therefore, the allocation of the terminals 301 to 303 to the first transmitter R1 and the second transmitters R2 to R4 can be freely set without the change of the wiring between the plurality of terminals 301 to 303 and the first transmitter R1 and the second transmitters R2 to R4.

The stop signal introduction unit A1 is configured so as to be capable of allocating the different terminals 301 to 303 to the first transmitter R1 and the second transmitters R2 to R4 and allocating the same terminals 301 to 303 to the first transmitter R1 and the second transmitters R2 to R4. Therefore, the allocation of the stop signals SS1 to SS3 to the first drivers 121A to 121F and the second drivers 131A to 131C can be further flexibly set. For example, when the number of the first drivers 121A to 121F is insufficient relative to the number of the basic axis motors 12A of the articulated arm 2, it is possible to allocate any of the second drivers 131A to 131C to the basic axis motor 12A and allocate the same stop signal to the second drivers and the drivers 121A to 121F.

The brake control board 150 is further provided that operates the brakes 13A and 13B provided corresponding to the motors 12A and 12B, respectively, with the stop signals BS1 to BS4. When any of the motors 12A and 12B stops with the stop of the output of any of the drive signals DS1 to DS9, the brake control board 150 operates the brake corresponding to the motor. By making the use of the stop signals BS1 to BS4, it is possible to operate the brakes 13A and 13B in conjunction with the stop of the motors 12A and 12B and more quickly stop the control target. Accordingly, a reduction in operation efficiency due to the stop and restart of the control target can be further prevented.

The embodiment is described above. However, the present invention is not necessarily limited to the embodiment but may be modified in various ways without departing from the spirit of the present invention. For example, a multi-axis apparatus to be controlled by the controller 10 is not limited to the articulated arm 2. Examples of a multi-axis apparatus other than the articulated arm 2 include a NC (Numerically-Controlled) machine.

The positioners 3 and 4 may perform the adjustment of the position of the workpiece W by translation or perform both the adjustment of the posture of the workpiece W by rotation and the adjustment of the position of the workpiece W by translation.

The number of the motors controlled by the controller 10 is not limited to nine. The controller 10 is only required to have the basic axis control part 120 capable of driving a plurality of motors and the external axis control part 130 capable of driving one or more motors, and the number of the motors that can be driven by each of the basic axis control part 120 and the external axis control part 130 may be different from the number of the motors described above.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A controller comprising:
a plurality of first drivers configured to output a plurality of drive signals to drive a plurality of actuators, respectively, and to stop an output of the plurality of drive signals in accordance with a first stop signal;
a second driver configured to output a drive signal to drive another actuator, and to stop an output of the drive signal in accordance with a second stop signal;
a first transmitter configured to transmit the first stop signal to all of the plurality of first drivers;
a second transmitter configured to transmit the second stop signal to the second driver; and
a stop signal introduction device configured to send a plurality of stop signals into the first transmitter and the second transmitter, respectively, the stop signal introduction device comprising:
a plurality of terminals configured to receive the plurality of stop signals, respectively; and
a stop signal allocator configured to set combinations between the plurality of stop signals received by the plurality of terminals and the first and second signals sent to the first transmitter and the second transmitter, in accordance with an input of settings from an outside.

2. The controller according to claim 1, further comprising:
a plurality of second drivers including the second driver; and
a plurality of second transmitters including the second transmitter, wherein
the plurality of second transmitters are provided corresponding to the plurality of second drivers, respectively.

3. The controller according to claim 1, wherein
the stop signal allocator is configured to be capable of allocating different terminals among the plurality of terminals to the first transmitter and the second transmitter and allocating the same terminals among the plurality of terminals to the first transmitter and the second transmitter.

4. The controller according to claim 1, further comprising:
a brake controller configured to operate brakes provided corresponding to the plurality of actuators and the another actuator in accordance with the first stop signal and the second signal so as to operate the brakes corresponding to the plurality of actuators and the another actuator in conjunction with a stop of the plurality of drive signals and the drive signal used to drive the plurality of actuators and the another actuator.

5. The controller according to claim 2, further comprising:
a brake controller configured to operate brakes provided corresponding to the plurality of actuators and the another actuator in accordance with the first stop signal and the second signal so as to operate the brakes corresponding to the plurality of actuators and the another actuator in conjunction with a stop of the plurality of drive signals and the drive signal used to drive the plurality of actuators and the another actuator.

6. The controller according to claim 3, further comprising:
a brake controller configured to operate brakes provided corresponding to the plurality of actuators and the another actuator in accordance with the first stop signal and the second signal so as to operate the brakes corresponding to the plurality of actuators and the another actuator in conjunction with a stop of the plurality of drive signals and the drive signal used to drive the plurality of actuators and the another actuator.

7. A robot system comprising:
a controller comprising:
  a plurality of first drivers configured to output a plurality of chive signals to drive a plurality of actuators, respectively, and to stop an output of the plurality of drive signals in accordance with a first stop signal;
  a second driver configured to output a drive signal to drive another actuator, and to stop an output of the drive signal in accordance with a second stop signal;
  a first transmitter configured to transmit the first stop signal to all of the plurality of first drivers;
  a second transmitter configured to transmit the second stop signal to the second driver; and
  a stop signal introduction device configured to send a plurality of stop signals into the first transmitter and the second transmitter, respectively, the stop signal introduction device comprising:
    a plurality of terminals configured to receive the plurality of stop signals, respectively; and
    a stop signal allocator configured to set combinations between the plurality of stop signals received by the plurality of terminals and the first and second signals sent to the first transmitter and the second transmitter, in accordance with an input of settings from an outside;
an articulated arm driven by all of the plurality of actuators, the plurality of actuators to operate in accordance with the plurality of drive signals from the plurality of first drivers; and
at least one external apparatus driven by the another actuator, the another actuator to operate in accordance with the drive signal from the second driver.

8. The robot system according to claim 7, wherein
a positioner provided as the external apparatus to adjust at least one of a posture and a position of a workpiece to be handled b the articulated arm,
the robot system further comprises
a fence surrounding the articulated arm and the positioner,
a door portion provided on the fence to allow coming and going of a person,
a window portion provided on the fence to allow coming and going of the workpiece,
a first sensor to detect opening of the door portion and to send a detected signal to the stop signal introduction device as one stop signal of the plurality of stop signals, and
a second sensor to detect entering of an object into the window portions and to send a detected signal to the stop signal introduction device as another stop signal of the plurality of stop signals, wherein
the first transmitter transmits the one stop signal from the first sensor to the plurality of first drivers, and
the second transmitter transmits the one stop signal from the first sensor and the another stop signal from the second sensor to the second driver.

* * * * *